(12) United States Patent
M (10) Patent No.: US 11,652,811 B2
(45) Date of Patent: May 16, 2023

(54) AUTOMATIC PROVISIONING

(71) Applicant: SAP SE, Walldorf (DE)

(72) Inventor: Sivakumar M, Pudukkottai (IN)

(73) Assignee: SAP SE, Walldorf (DE)

( * ) Notice: Subject to any disclaimer, the term of this patent is extended or adjusted under 35 U.S.C. 154(b) by 91 days.

(21) Appl. No.: 16/894,661

(22) Filed: Jun. 5, 2020

(65) Prior Publication Data

US 2021/0328979 A1    Oct. 21, 2021

(30) Foreign Application Priority Data

Apr. 16, 2020    (IN) .............................. 202011016399

(51) Int. Cl.
*H04L 9/40* (2022.01)
*H04L 9/08* (2006.01)

(52) U.S. Cl.
CPC ........ *H04L 63/0807* (2013.01); *H04L 9/0891* (2013.01); *H04L 63/068* (2013.01); *H04L 63/0876* (2013.01)

(58) Field of Classification Search
CPC . H04L 63/0807; H04L 9/0891; H04L 63/068; H04L 63/0876
See application file for complete search history.

(56) References Cited

U.S. PATENT DOCUMENTS

| | | | |
|---|---|---|---|
| 7,831,236 B2 * | 11/2010 | Robertson | H04W 8/18 455/410 |
| 9,923,881 B2 * | 3/2018 | Smith | H04L 67/12 |
| 10,291,477 B1 | 5/2019 | Askar | |
| 10,447,683 B1 * | 10/2019 | Loladia | H04W 12/71 |
| 2016/0044012 A1 * | 2/2016 | Carrer | H04L 41/0803 726/6 |
| 2016/0277191 A1 * | 9/2016 | Lee | H04L 63/0823 |
| 2016/0308861 A1 | 10/2016 | Ameling et al. | |
| 2017/0288786 A1 * | 10/2017 | Al-Mousa | H04B 11/00 |
| 2018/0054327 A1 | 2/2018 | Ameling | |
| 2018/0109395 A1 | 4/2018 | Berdy et al. | |
| 2018/0367528 A1 * | 12/2018 | Schwarz | H04L 9/0894 |
| 2019/0028459 A1 | 1/2019 | Fries et al. | |

(Continued)

OTHER PUBLICATIONS

Anonymous "Introducing Keyscaler", Device Authority, downloaded Jan. 8, 2020, https://www.deviceauthority.com/solutions/device-registration-onboarding-and-provisioning, 2 pages.

*Primary Examiner* — Jung W Kim
*Assistant Examiner* — Alan Lingqian Kong
(74) *Attorney, Agent, or Firm* — Fountainhead Law Group P.C.

(57) ABSTRACT

The present disclosure pertains to provisioning of credentials, and in particular to provisioning of authentication credentials to a computer device for accessing a cloud platform computer system. The computer device obtains sensor data and sends a request including a device identifier to a provisioning server using a provisioning server network address. The computer device receives a response, from the provisioning server, including a platform credential and a platform server network address of a platform server. The computer device stores the platform credential. The computer device sends the sensor data and the platform credential to the platform server using the platform server network address.

17 Claims, 5 Drawing Sheets

(56) References Cited

U.S. PATENT DOCUMENTS

| | | | |
|---|---|---|---|
| 2019/0042708 A1* | 2/2019 | Pala | H04L 63/0823 |
| 2019/0098089 A1* | 3/2019 | Shim | H04L 67/2823 |
| 2019/0207755 A1* | 7/2019 | Gu | H04L 9/0643 |
| 2019/0385102 A1 | 12/2019 | Said et al. | |
| 2020/0177589 A1* | 6/2020 | Mangalvedkar | G06F 16/245 |
| 2020/0275273 A1* | 8/2020 | Smith | H04W 8/005 |
| 2021/0120412 A1* | 4/2021 | Bruner | H04W 4/50 |
| 2021/0168132 A1* | 6/2021 | Smith | H04L 63/104 |

\* cited by examiner

AUTOMATIC PROVISIONING

CROSS REFERENCE TO RELATED APPLICATIONS

The present application claims priority to Indian provisional application number 202011016399, filed Apr. 16, 2020, the contents of which are incorporated herein by reference in its entirety.

BACKGROUND

The present disclosure pertains to provisioning of credentials, and in particular to provisioning of authentication credentials for accessing a cloud platform computer system.

A "cloud platform" generally refers to a computer system including computer and networking infrastructure providing software applications, tools, and service to users or organizations that do not directly control or manage that infrastructure. "Cloud computing" generally refers to the access and use of such cloud platforms by computer devices (e.g., personal computer, tablet, or smartphone) over a network (e.g., the Internet or an intranet). In general, to onboard a computer device to a cloud platform, a cloud platform authentication credential must be securely transferred to the computer device. This credential may be used to connect to the cloud platform (e.g., to access data from or report data to the cloud platform). Certain computer devices include authentication credentials for a particular cloud platform that are manually hardcoded to the computer device during manufacturing of the devices. Other computer devices may have authentication credentials manually provisioned by a system administrator during installation of the device at a particular location.

After onboarding a computer device to a particular cloud platform there may be a need to re-provision the authentication credentials. For example, authentication credentials may need to be re-provisioned to one or more computer devices when a user or organization switches to a new cloud platform (e.g., the new cloud platform may use different authentication keys). However, re-provisioning may be impractical or impossible in certain situations. For instance, if the credentials are hardcoded during manufacturing then it may not be possible to remove or add different credentials. If the credentials were manually installed by a system administrator during installation, then re-provisioning may be impractical if there is a large number of computer devices. Re-provisioning may be more impractical if the computer devices are not physically accessible or difficult to access.

The present disclosure addresses these issue and others, as further described below.

SUMMARY

One embodiment provides a computer device. The computer device includes one or more processors. The computer device further includes one or more sensors. The computer device further includes machine-readable medium coupled to the one or more processors and storing computer program code. The computer program code includes sets instructions executable by the one or more processors. The instructions are executable to obtain sensor data from the one or more sensors. The instructions are further executable to send a request for a platform credential to a provisioning server using a provisioning server network address. The request includes a device identifier of the computer device. The instructions are further executable to receive a response from the provisioning server. The response includes a platform credential and a platform server network address of a platform server. The instructions are further executable to store the platform credential. The instructions are further executable to send the sensor data and the platform credential to the platform server using the platform server network address.

Another embodiment provides one or more non-transitory computer-readable medium storing computer program code. The computer program code includes sets of instructions to obtain sensor data from one or more sensors. The computer program code further includes sets of instructions to send a request for a platform credential to a provisioning server using a provisioning server network address. The request includes a device identifier of the computer device. The computer program code further includes sets of instructions to receive a response from the provisioning server. The response includes a platform credential and a platform server network address of a platform server. The computer program code further includes sets of instructions to store the platform credential. The computer program code further includes sets of instructions to send the sensor data and the platform credential to the platform server using the platform server network address.

Another embodiment provides a computer-implemented method. The method includes obtaining, by a computer device, sensor data from the one or more sensors. The method further includes sending, by the computer device, a request for a platform credential to a provisioning server using a provisioning server network address. The request includes a device identifier of the computer device. The method further includes receiving, by the computer device, a response from the provisioning server. The response includes a platform credential and a platform server network address of a platform server. The method further includes storing, by the computer device, the platform credential. The method further includes sending, by the computer device, the sensor data and the platform credential to the platform server using the platform server network address.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

As mentioned above, a "cloud platform" generally refers to computer server and networking infrastructure providing software applications, tools, and services to users or organizations that do not directly control or manage the infrastructure. Different examples of cloud platforms include a platform for managing people and groups of people in an organization or company, a platform for inputting and tracking orders and shipments, or a platform for reporting, analyzing, and presenting or visualizing data.

"Cloud computing" generally refers to the access of such cloud platforms by a computer device (e.g., personal computer, tablet, or smartphone) over a network (e.g., the Internet or an intranet). The computer device may provide data to the cloud platform and or retrieve data from the cloud platform. In certain situations (e.g., where security is a concern), a cloud platform authentication credential may be securely provisioned to the computer device for use in authenticating with the cloud platform. The cloud platform may verify a credential from a computer device before allowing the computer device to access the cloud platform (e.g., to send or report data to the cloud platform or receive data from the cloud platform).

Certain computer devices are hardcoded with authentication credentials for a particular cloud platform during manufacturing of the devices. It may not be possible to re-provision credentials for such devices if the hardcoded credential cannot be changed. In some cases, the computer devices may have authentication credentials manually installed by a system administrator during installation of the device at a particular location. For example, to onboard an internet-of-things (IoT) device to an IoT cloud platform, cloud platform credentials may be hardcoded to the IoT device during manufacturing so that the IoT device can connect to the IoT cloud platform and start reporting or posting data. An IoT device is generally is a set of computer hardware connected to the Internet, and or other IoT devices or computer systems. An IoT device may have sensors that transmits data from one place to another over the Internet. Types of IoT devices include wireless sensors, software, actuators, and computer devices. An IoT device may be embedded into another computer device, facility, or structure (e.g., industrial equipment, agricultural equipment or structures, or medical devices).

After a computer device is configured to communicate with a particular cloud platform there may be a need to re-provision the authentication credentials. For example, the previously authenticate credentials may no longer be valid (e.g., the credentials may have been compromised). In another example, authentication credentials may need to be re-provisioned to the computer device when a user or organization switches to a new cloud platform that uses different secret cryptographic keys for authenticating credentials—the new cloud platform may not be able to authenticate the credentials previously provisioned to the computer devices. However, re-provisioning may be impractical or impossible in certain situations. For instance, if the credentials are hardcoded during manufacturing then it may not be possible to re-provision different credentials. If the credentials were manually installed by a system administrator during installation, then re-provisioning may be impractical if there is a large number of computer devices or when the computer devices are not easily accessible. For example, manually re-provisioning of certificates may involve a system administrator or service engineer connecting another computer device (e.g., a tablet or laptop computer) to the computer device to have its credential re-provisioning. To do this on enterprise-scale would require a large amount of time, making manual re-provisioning impractical. Giving hardcoded credentials information to any intermediate entity may not be possible as it may pose a serious security issue. For these reasons it may not be possible to perform re-provisioning for certain computer devices or for computer devices in certain circumstances.

In one example, IoT devices may be installed in an agricultural silo for monitoring the environmental conditions within the silo. Such silos may be tens of meters tall and may contain hundreds of IoT devices. There may be dozens or hundreds of such silos at a particular location. In this situation, it may be impractical for service engineers to manually re-provisioning thousands of IoT devices individually. Furthermore, the IoT devices may not be accessible for such manual re-provisioning due to their installation in the silo. Accordingly, there is a need for systems and methods for automatically provisioning and re-provisioning authentication credentials.

The present disclosure provides systems, methods, and techniques for automatic provisioning and re-provisioning of credentials which address the problems described above. The process of provisioning and re-provisioning described herein automates the process without compromising security, thereby making it quicker and easier onboard computer devices to a cloud platform at a large scale. In addition to automatic provisioning, re-provisioning may also be automated. Accordingly, the techniques for automated provisioning described herein advantageously enable automatic migration of computer devices (e.g., IoT devices) from one cloud platform to another cloud platform (e.g., an IoT cloud platform).

A provisioning server is provided to enable automatic provisioning and re-provisioning of credentials to one or more computer devices. The provisioning server may be installed at the same site where the computer devices are deployed or located. That is, the provisioning server is installed "on-premises." To enable automatic provisioning, the device manufacturer may hardcode or store a device identifier (e.g., a unique identifier) and provisioning server information on a computer device during manufacture. The provisioning server information may include a network address of the provisioning server (e.g., an IP address or URL), for example. The provisioning server information may also include network credentials for use in communicating with the provisioning server. In some embodiments, the device identifier and provisioning server information may be stored on the compute device during manufacture without being hardcoded. The device identifier and provisioning server may be installed on a storage unit (e.g., hard disk drive, solid state disk drive, or flash memory) or in a hardware security module or secure chip of the computer device.

In providing automatic provisioning, the provisioning server may act as a mediator between computer devices and a cloud platform. The provisioning server may also handle securely transfer of authentication credentials to devices without any manual intervention. The computer devices may be configured or programmed to send a credential request (e.g., a request message) to the provisioning server if there are no credentials available. The computer devices may also be configured or programmed to send a credential request to the provisioning server if a request or another communication to the cloud platform fail.

The authentication credential may be an access token. For example, the credential may be a symmetric JavaScript Object Notation (JSON) web token (JWT). A JWT generated by the cloud platform may be transferred to the computer device using the provisioning server. Using a JWT as the authentication credential may be advantageous for certain resource constrained devices, such as IoT devices, as the JWT is lightweight—having a small storage size and a low network overhead. In addition, JWT tokens are effective if they are used with security protocols (e.g., using Hypertext transfer protocol secure (HTTPS), instead of HTTP or MQ Telemetry Transport (MQTT), with Transport Layer Security (TLS) or Secure Sockets Layer (SSL). Other access tokens or authentication credentials may be used depending on the capabilities and constraints of a particular computer device or cloud platform.

A high-level overview of an exemplary provisioning process is now described. During manufacturing of the computer device, the manufacturer may provide a device identifier and provisioning server information (e.g., network address) to the computer device. The device identifier and the provisioning server information may be hardcoded to the computer device. The manufacturer may not provide or hardcode a credential for authenticating with a cloud platform. Then, the computer device may be installed at a particular site for operation. In some implementations, the device identifier and provisioning server information may be provided by a system administrator at the installation site instead of during manufacturing.

After booting up, the computer device may check for cloud platform credentials. If credentials are not available, the computer device may send a credential request to provisioning server. The request may include a device identifier of the computer device. The request may be sent using the provisioning server details stored or hardcoded by the manufacturer. The provisioning server may register the computer device in a device directory. In some implementations, the device directory may be pre-configured with device information for expected or authorized devices and the computer device that sent the credential request may be validated against the pre-configured directory. The provisioning server may then send a credential request to a cloud platform.

The cloud platform may receive the request from provisioning server. The cloud platform may authenticate the provisioning server (e.g., using an authentication token or certificate authority (CA) certificate). The cloud platform may generate a credential for the computer device (e.g., a JWT including the device identifier of the computer device in the payload). The cloud platform may send the authentication credential to the provisioning server. The provisioning server may receive the authentication credential. The provisioning server may send the authentication credential and cloud platform information to the computer device. The cloud platform information may include information for communicating with the cloud platform, such as a network address.

The computer device receives and stores the authentication credential token. As such, the computer device is now provisioned with the authentication credential. After the computer device has been provisioned with an authentication credential, the computer device may send data to the cloud platform along with the authentication credential. The data and credential may be sent to the cloud platform over a network using the cloud platform information. The cloud platform may receive the data and authentication credential from the computer device. The cloud platform may validate the credential from the device. If the credential is valid, the cloud platform may accept the data sent by the computer device. This data may be stored and processed. In some implementations, the cloud platform may analyze the data from the computer device along with data received from other computer devices. In some implementations, the cloud platform may make the results of the analysis available via a user interface of the cloud platform (e.g., via a web site or software application).

Automatic provisioning processes are explained in further detail below.

Figure 1:
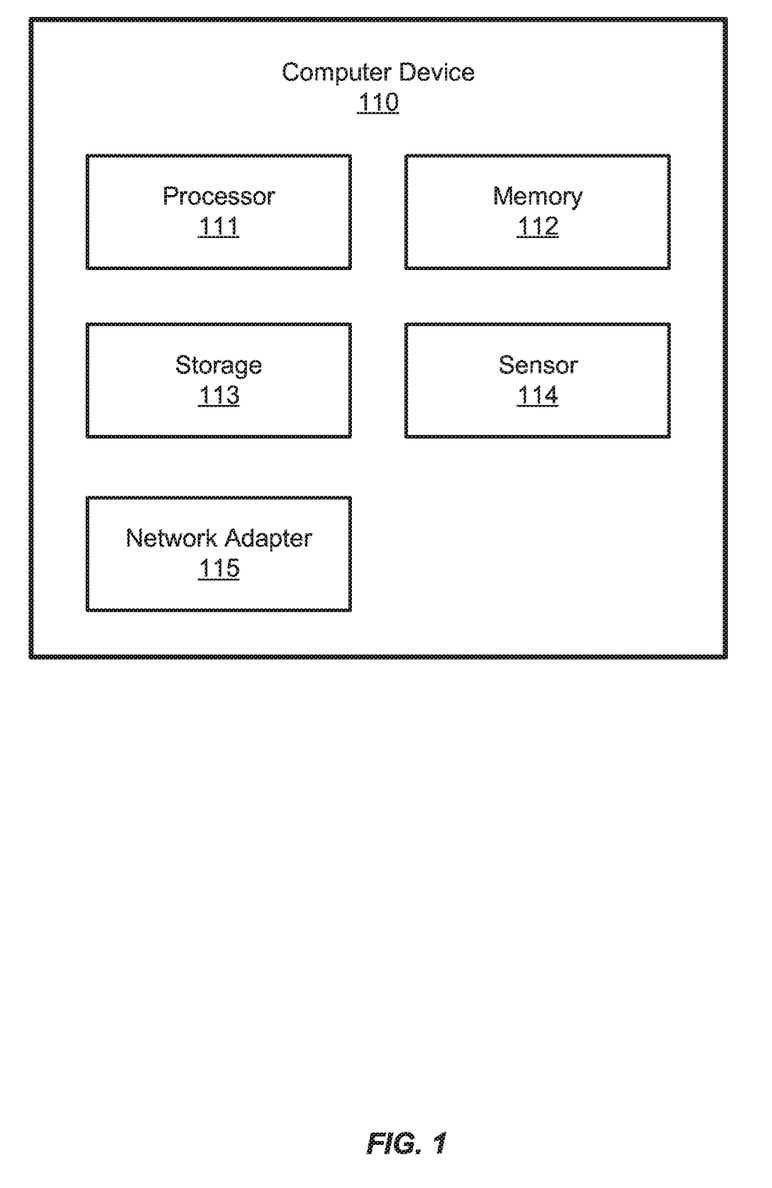
FIG. 1 shows a diagram of a computer device, according to an embodiment.

A computer device may be automatically provisioned with an authentication credential for authenticating with a cloud platform as described herein. FIG. 1 shows a diagram of a computer device 110, according to an embodiment. The computer device 110 may be a desktop computer, laptop computer, tablet, smartphone, wearable device, or internet-of-things (IoT) device, for example. The computer device includes a processor 111 (e.g., a central processing unit). The processor 111 comprises circuitry for processing data and executing instructions. The computer device 110 may include more than one processors. The processor 111 may be configured to execute instructions stored in a non-transitory computer or machine readable medium, such as a memory 112 or a storage unit 113. At least some of the instructions, when executed, may perform the process for requesting a credential and sending data to a cloud platform, as described herein.

The memory 112 may be coupled to the processor 111. The memory 112 may store information and instructions to be executed by processor 111, including information and instructions for performing some of the techniques described above, for example. This memory may also be used for storing programs executed by processor 111. The memory 112 may comprise random access memory (RAM), for example.

The computer device 110 also includes storage 113 used for storing information and instructions. The storage 113 may comprise a disk drive or flash memory, for example. The storage 113 may be used for storing the provisioning server information (e.g., a provisioning server network address), for example. The storage 113 may be used for storing an authentication credential for accessing a cloud platform, for example.

The computer device 110 also includes a sensor 114. The computer device 110 may include one or more sensors 114. The sensor 114 may be used to record data (e.g., environmental data). For example, the sensor 114 may be a temperature sensor or a pressure sensor. Output data from the sensor 114 may be stored in the memory 112 or in the storage 113.

The computer device 110 also include a network adapter 115. The network adapter may provide for wireless communication, for example. The network adapter 115 may provide for communication with a provisioning server. The network adapter 115 may provide for communication with a cloud platform (e.g., a server of a cloud platform).

Figure 2:
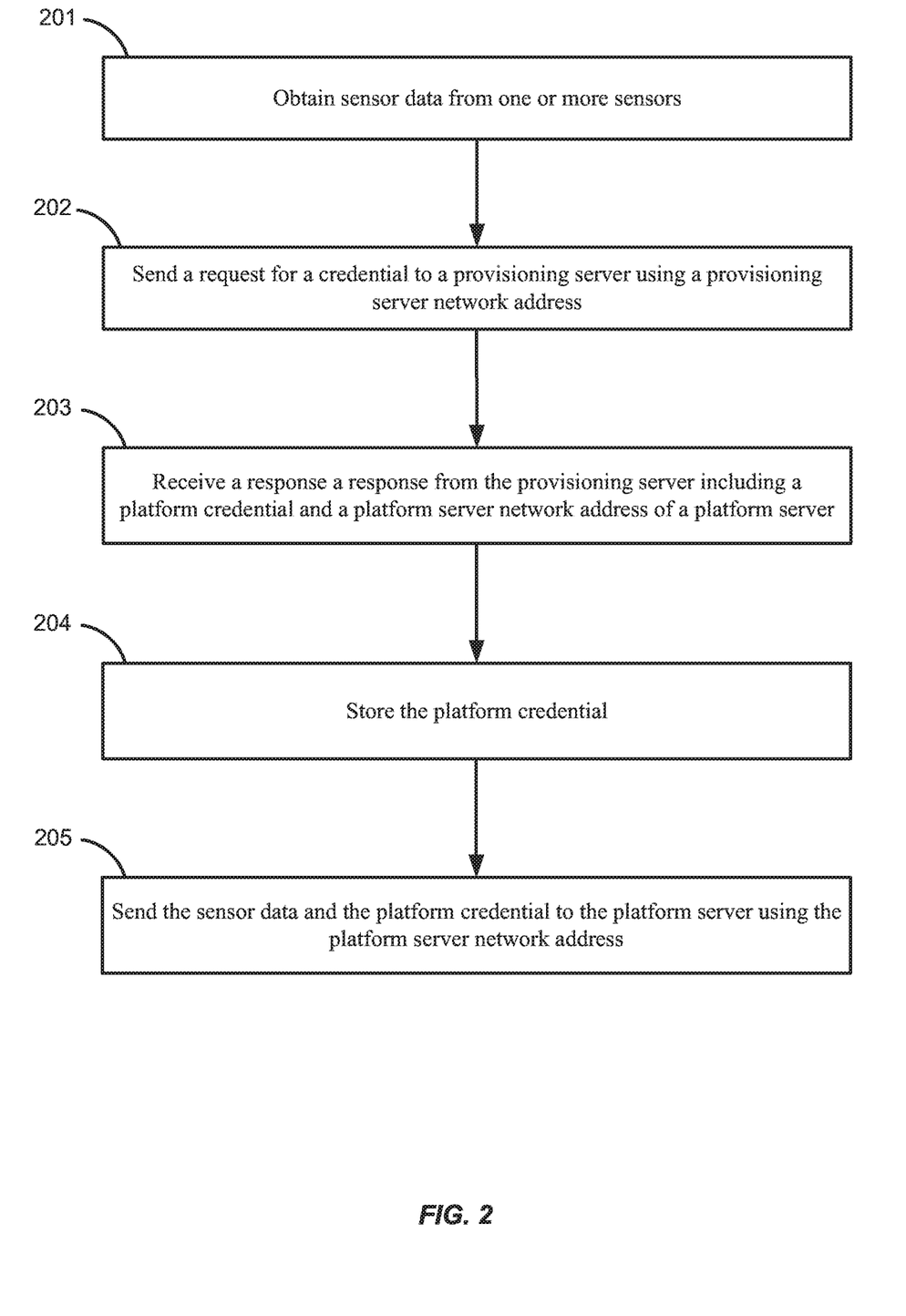
FIG. 2 shows a flowchart of a method for provisioning and using a credential, according to an embodiment.

The computer device of FIG. 1 may be configured to communicate with a provisioning server to automatically request an authentication credential, if needed, without user input or intervention. FIG. 2 shows a flowchart of a method for provisioning and using a credential, according to an embodiment. The method may be implemented by a computer device or an IoT devices as described herein.

At 201, the computer device may obtain sensor data from one or more sensors. In some implementations the one or more sensors may include a temperature sensor or a pressure sensor, for example. In some embodiments the one or more sensors may include an accelerometer, a light sensor, humidity sensor, gas sensor, an infrared sensor, or a network sensor, for example. The sensor data may be raw data or processed data from the one or more sensors.

At 202, the computer device may send a request for a credential to a provisioning server using a provisioning server network address. The request may include a device identifier of the computer device. The device identifier may be unique (e.g., unique among device identifiers of devices manufactured by the same manufacturer or among device identifiers for devices operated by a particular organization). In some implementations, the provisioning server network address may be hardcoded to the computer device. That is, the platform server network address may be directly stored on the computer device (e.g., in the program code to be executed by the computer device). In some implementations, the device identifier may be hardcoded to the computer device. Such hardcoded data (e.g., the server network address) may not generally be changed, such as by a user input, a configuration file, or in response to a message or command, for example. The hardcoded data may be provided by the manufacturer during manufacture of the computer device or it may be provided during installation of the computer device.

At 203, the computer device may receive a response a response from the provisioning server including a platform credential and a platform server network address of a platform server. The platform credential may be generated by a server computer of the cloud platform. The platform credential may be based on the device identifier of the computer device such that the cloud platform may use the platform credential to authenticate the computer device. The platform credential may be used for offline validation (e.g., without further communicating with the computer device) based on the information stored in the credential.

In some implementations, the platform credential may be a JSON Web Token (JWT). The JWT may include an indicator of the encryption algorithm type, a payload, and a signature. The payload may be based on the device identifier and or sensor data. The signature may be generated based on the sensor data. The cloud platform may authenticate the data received from the computer device based on the payload and the signature.

At 204, the computer device may store the platform credential. The platform credential may be based on the device identifier as described above. The computer device may check for the stored platform credential prior to sending data to the platform server. In some implementations, the platform credential may also include an indication of an expiration date after which the credential is no longer valid. The computer device may be configured to determine whether the platform credential is valid and automatically send a credential request to the provisioning server if the credential is invalid or not available in storage.

At 205, the computer device may send the sensor data and the platform credential to the platform server using the platform server network address. The platform server may use the platform credential to authenticate the computer device. The authentication of the computer device may involve matching a device identifier of the computer device with the device identifier indicated by the platform credential. This authentication may be performed offline without further communication with the computer device.

Figure 3:
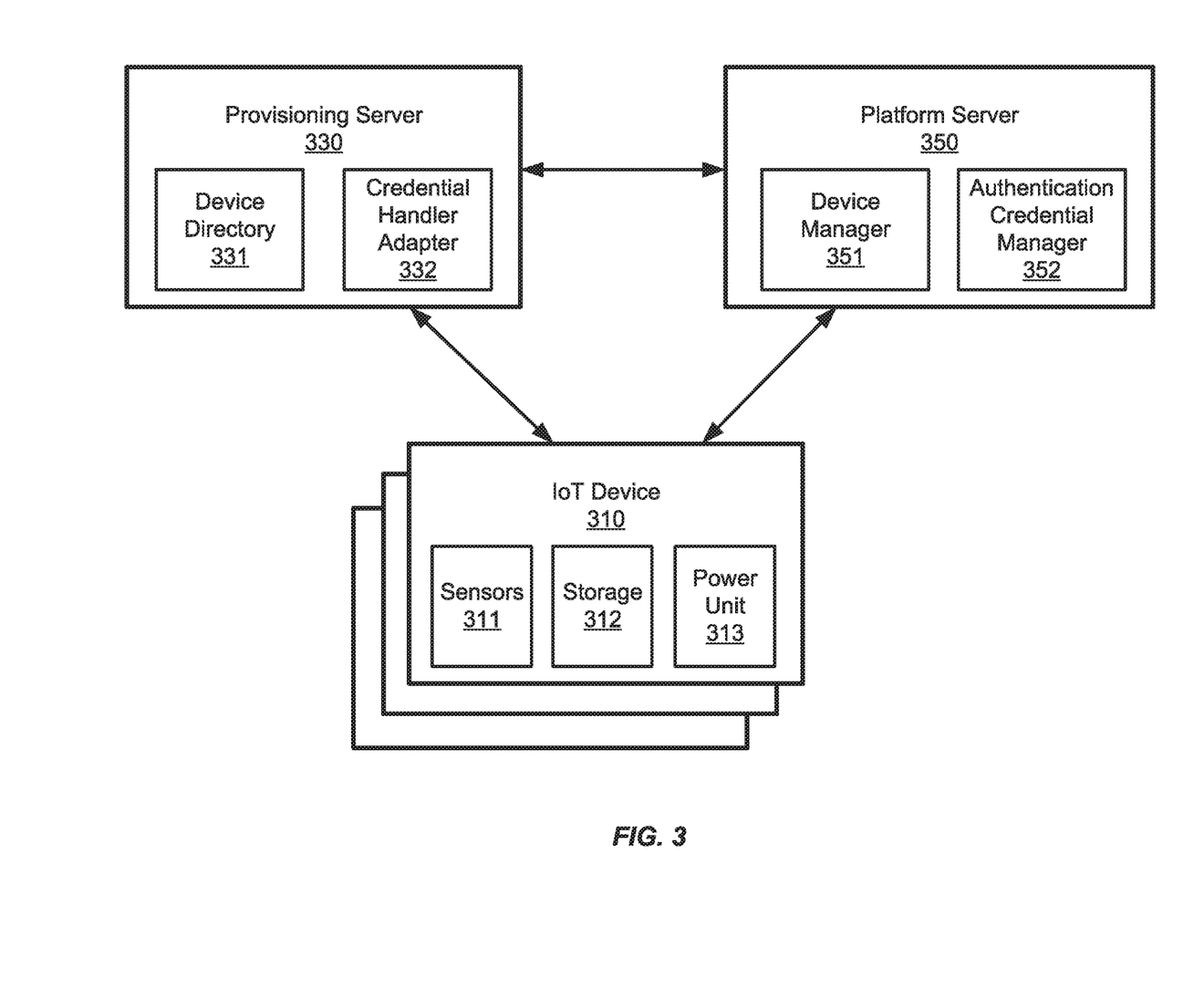
FIG. 3 shows a system including an internet-of-things device, a provisioning server, and a platform server, according to an embodiment.

As described above, a computer device (e.g., an IoT device) may automatically determine whether it has a stored and valid credential for communicating with a cloud platform (e.g., a server of a cloud platform) and then request a credential from a provisioning server if it does not have a valid credential available. FIG. 3 shows a system including an internet-of-things device 310, a provisioning server 330, and a platform server 350, according to an embodiment.

The IoT device 310 is one example of a computer device as described herein. The IoT device may be installed in a building or structure. Numerous IoT devices may be installed in the same building or structure. For example, hundreds of IoT devices having sensors may be installed in a large agricultural silo.

The IoT device 310 may include one or more sensors 311, a storage unit 312, and a power unit 313. The one or more sensors 311 may include a temperature sensor, a pressure sensor, or a humidity sensor, for example.

The storage unit 312 may be configured to store sensor data from the one or more sensors 311. The storage unit 312 may also be used to store the platform credential. The storage unit 312 may also be used to store provisioning server information (e.g., a network address, such as an Internet protocol address). The storage unit 312 may also be used to store platform server information. The provisioning server (e.g., a network address, such as an Internet protocol address).

The power unit 313 provides power to the IoT device 310. The IoT device may be configured to determine whether it is storing a valid credential when it is powered on. In some implementations, the IoT device may be configured to determine whether it is storing a valid credential when it has sensor data to be reported to a cloud platform.

The provisioning server 330 includes a device directory 331 and a credential handler adapter 332. The provisioning server 330 may be located on the premises of an organization, at the same location (or nearby) where the IoT device 310 is installed. The provisioning server 320 and the IoT device 310 may be connected using a local area network not using the Internet. In some implementations there may be multiple provisioning servers 330 in communication with the IoT devices 310.

The device directory 331 includes a list of all the device identifiers of IoT devices 310 being managed by the provisioning server. The provisioning server 330 may register IoT devices 310 in the directory server 331 as credential requests are received by the provisioning server 330. In some implementations, the device directory 331 may be pre-configured with a list of device identifiers based on the particular devices expected to be managed by the provisioning server 330.

The credential transfer handler 332 processes the request from the IoT device 310 and generates a request for the authentication credential from the platform server 350. The provisioning server 330 sends the request for the authentication credential to the platform server 360 over a network, such as the Internet.

The platform server 350 includes a device manager 351 and an authentication credential manager 352. The platform server 350 may be used to provide a cloud platform. The cloud platform may be provided by a plurality of servers. The cloud platform may receive data from a plurality of IoT devices such as the IoT device 310, process the received data, and provide information based on the processed data to users of the cloud platform.

The device manager 351 includes a list of the device devices that are connected to the cloud platform. The device manager 351 may include information such as the device identifier. The cloud platform may be handling several different provisioning servers and the device manager 351 may include an identifier of the provisioning server managing a particular device. The device manager 351 may also include an indication of whether or not a particular device is authorized to use the cloud platform or not. For example, if the sensors of a particular IoT device are out of specification, or if a particular IoT device has been tampered with, the information in the device manager 351 may indicate that the particular IoT device is not authorized to use the cloud platform.

The authentication credential manager 352 generates the authentication credentials (e.g., a JWT token) for each IoT device 310 and sends the authentication credential back to the corresponding provisioning server 330.

As such, the cloud platform can use a platform server 350 to provide credentials to a provisioning server 330. The platform server 350 may be in communication with numerous provisioning servers of different organizations. And each of the provisioning servers may be managing their own set of IoT devices 310.

Figure 4:
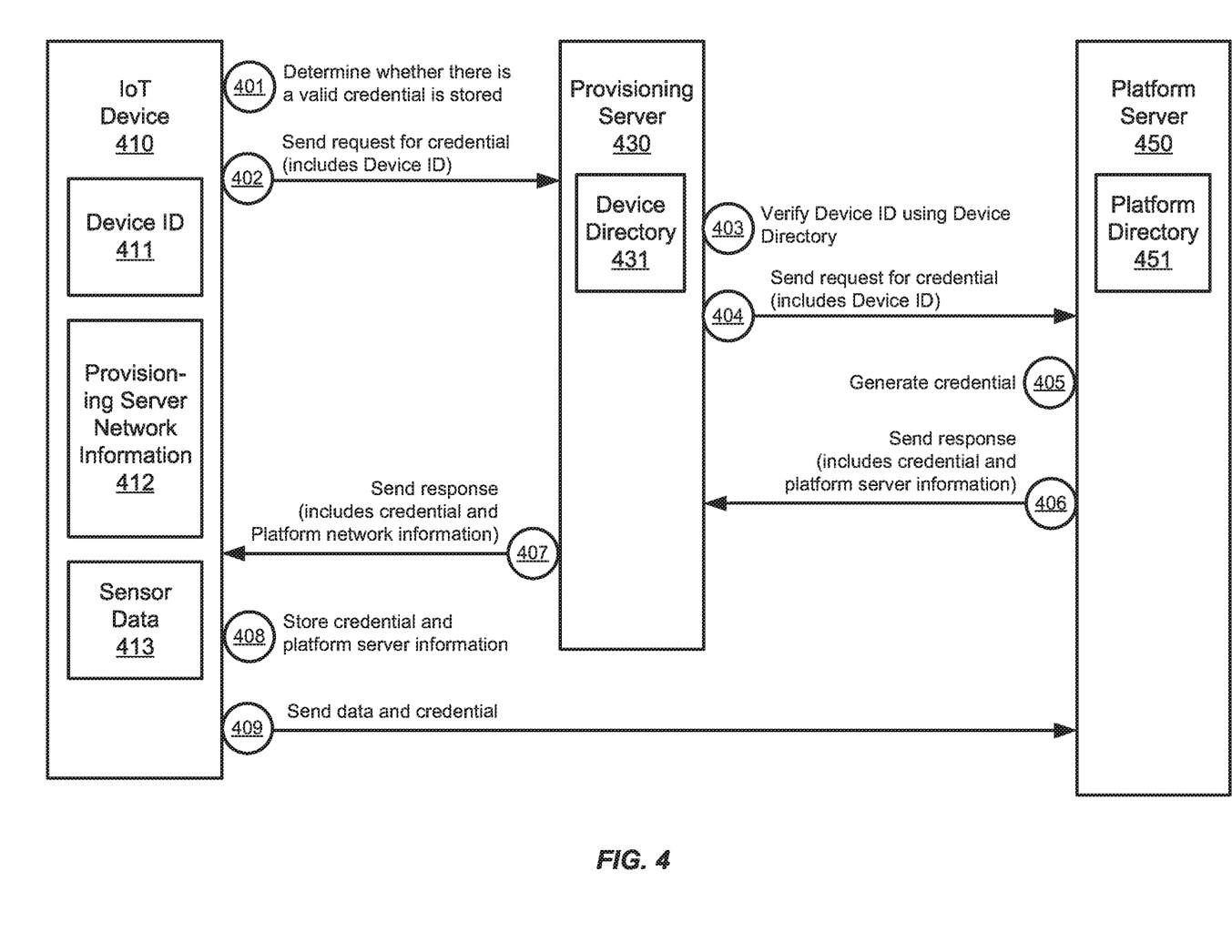
FIG. 4 shows an information flow diagram for provisioning a credential to an internet-of-things device and using the credential to authenticate with a platform server, according to an embodiment.

FIG. 4 shows an information flow diagram for provisioning a credential to an internet-of-things device 410 and using the credential to authenticate with a platform server 350, according to an embodiment. The IoT device 410 stores a device identifier 411, provisioning server network information 412, and sensor data 413. A provisioning server 430 handles provisioning of credentials to the IoT device 410. The provisioning server includes a device directory 431. The device directory 431 may be used and configured similar to the device directory 331 of FIG. 3 described above. The platform server 450 includes a platform directory 451. The platform directory may be used and configured similar to the device manager 351 described above with respect to FIG. 3.

Prior to the information flow diagram shown in FIG. 4, a manufacturer of the IoT device 410 may feed the device identifier 411 and the provisioning server information 412 to the IoT device 410. This information may be hardcoded to the IoT device 410.

At 401, the IoT device 410 may determine whether there is a valid credential stored. This check may be performed when the IoT device 410 is powered on (e.g., on the first boot up and/or on subsequent boot ups).

At 402, if credentials are not available or are invalid, the IoT device 410 sends a credential request to the provisioning server 430. The credential request may be sent over a local intranet. The credential request may be sent using the provisioning server network information 412, which may include an IP address or URL or other networking information or credentials. The credential request includes the device identifier 411.

The provisioning server 430 receives the credential request from the IoT device 410. At 403, the provisioning server 430 verifies the device identifier 411 included in the credential request. For instance, the provisioning server 430 may check the device identifier 411 against authorized device identifiers stored in the device directory 431. In some implementations, the provisioning server 430 may registering the device identifier in device directory 431 without performing verification.

At 404 the provisioning server 430 sends a request for a credential to the platform server 450. This request may be sent over the Internet. This request includes the device identifier 411 of the IoT device 410.

The platform server 450 receives the request from the provisioning server 430. In some implementations the platform server 450 may verify or authenticate the provisioning server 430. For example, the provisioning server may be authenticated based on a certificate authority (CA) certificate.

At 405, the platform server 450 generates a credential for the IoT device 410. The credential may be a JWT token with a payload based on the device identifier, for example. The device identifier may be used by the platform server 450 to identify a particular symmetric key usable to authenticate the credential for that particular IoT device 410. Information about the particular IoT device 410 may be stored in the platform directory. Information about the credential generated for the IoT device 410 may also be stored in the platform directory 451.

At 406, the platform server 450 sends a response to the provisioning server 430 including the generated credential. The response may also include provisioning server information (e.g., a provisioning server network address) to be provided to the IoT device 410. This response may be sent to the provisioning server 430 over the Internet, for example.

The provisioning server 430 receives the response from the platform server 450. At 407, the provisioning server 430 sends the authentication credential and the platform server information to the IoT device 410.

The IoT device 410 receives the authentication credential and the platform server information from the provisioning server 430 (e.g., over an intranet). At 408, the IoT device 410 stores the authentication credential and the platform server information.

At 409, after sensor data 413 is available and ready to be reported, the IoT device 410 sends the sensor data 413 and the stored authentication credential to the platform server 450 (e.g., over the Internet). The IoT device 410 may send this information based on the stored platform server information. For example, the IoT 410 may use a network address of the platform server 450 to send the sensor data 413 and the authentication credential to the platform server 450.

The platform server 450 receives the sensor data 413 and the authentication credential from the IoT device 410. Using the authentication credential, the platform server 450 may determine whether the IoT device us authorized or not. This may be performed offline without further communication from the IoT device. For example, the platform server 450 may determine an identifier of the computer device from the credential and match the identifier to the information stored in the platform directory 451. The platform server 450 may verify the signature of the credential using a particular secret key associated with that particular device identifier. If the signature can be verified, then the sensor data from the IoT device 410 may be accepted by the platform server 450. If the signature is not valid, the data received from the IoT device 410 may not be accepted.

As such the IoT device 410 may be automatically provisioned with credentials. This process may be advantageous during manufacture and/or during installation of the IoT device 410 as the credentials would not need to be manually loaded by the manufacturer or a system administrator.

A similar provisioning process as in FIG. 4 may be used to re-provision credentials to the IoT device 410. Re-provisioning may be required if the organization managing the IoT device 410 switches to a different cloud platform as a different credential would be needed to authenticate with different servers.

To initiate re-provisioning, the provisioning server 430 may send a message or command to the IoT device 410 indicating to remove or delete the platform credential. The IoT device 410 will delete the credential in response to this message. The next time that the IoT powers or needs to send data, it may (at 401) determine whether there is a valid credential stored and it will determine that there is no valid credential stored, causing it to automatically request (at 402) a new credential from the provisioning server 430.

As such, the IoT device 410 may be automatically provisioned and also re-provisioned. The automatic provisioning process described above is advantageous because it avoid manual provisioning of each IoT device by a system administrator. As described above, it may be impractical to manually re-provision credentials after IoT devices have been installed (e.g., if hundreds of devices are installed in inaccessible places in a large agricultural silo). Prior systems could not achieve automatic provisioning and re-provisioning as the computer devices or IoT devices may have hardcoded credentials and the servers communicating with these devices may not have been configured to provide certificates or been able to command the devices to delete their certificates, for example.

The following are additional exemplary implementations of the automatic provisioning techniques described herein.

One exemplary implementation of the automatic provisioning techniques described herein includes a computer device. The computer device includes one or more processors, one or more sensors, and machine-readable medium coupled to the one or more processors. The machine-readable medium stores computer program code comprising sets instructions executable by the one or more processors. The instructions are executable to obtain sensor data from the one or more sensors. The instructions are further executable to send a request for a platform credential to a provisioning server using a provisioning server network address where the request includes a device identifier of the computer device. The instructions are further executable to receive a response from the provisioning server where the response includes a platform credential and a platform server network address of a platform server. The instructions are further executable to store the platform credential. The instructions are further executable to send the sensor data and the platform credential to the platform server using the platform server network address.

In some implementations, the provisioning server network address is hardcoded to the computer device.

In some implementations, the instructions are further executable to receive a message from the provisioning server where the message indicates to delete the stored platform credential, delete the stored platform credential, and send a second request for a second platform credential to the provisioning server using the provisioning server network address where the second request includes the device identifier of the computer device.

In some implementations, the platform server is a first platform server and the instructions are further executable to receive a second response from the provisioning server, where the second response includes a second platform credential and a second platform server network address of a second platform server, store the second platform credential, and send second sensor data and the second platform credential to the second platform server using the second platform server network address.

In some implementations, the platform credential includes an expiration indicator and the instructions are further executable to determine that the platform credential is invalid based on the expiration indicator and send a second request for a second platform credential to the provisioning server using the provisioning server network address, where the second request includes the device identifier of the computer device.

In some implementations, the platform credential is a JavaScript object notation web token including a payload indicating the device identifier of the computer device.

In some implementations, the request for the platform credential is sent to the provisioning server over a local area network connection or an intranet connection, the response from the provisioning server is received over the local area network connection or the intranet connection, and the sensor data and the platform credential are sent to the platform server over an Internet connection.

Another exemplary implementation of the automatic provisioning techniques described herein includes one or more non-transitory computer-readable medium storing computer program code comprising sets of instructions. The instructions are executable to obtain sensor data from one or more sensors, send a request for a platform credential to a provisioning server using a provisioning server network address, where the request includes a device identifier of the computer device, receive a response from the provisioning server, where the response includes a platform credential and a platform server network address of a platform server, store the platform credential, and send the sensor data and the platform credential to the platform server using the platform server network address.

In some implementations, the provisioning server network address is hardcoded to the computer device.

In some implementations, the instructions are further executable to receive a message from the provisioning server, where the message indicates to delete the stored platform credential, delete the stored platform credential, and send a second request for a second platform credential to the provisioning server using the provisioning server network address, where the second request includes the device identifier of the computer device.

In some implementations, the platform server is a first platform server, and the instructions are further executable to receive a second response from the provisioning server, where the second response includes a second platform credential and a second platform server network address of a second platform server, store the second platform credential, and send second sensor data and the second platform credential to the second platform server using the second platform server network address.

In some implementations, the platform credential includes an expiration indicator and instructions are further executable to determine that the platform credential is invalid based on the expiration indicator, and send a second request for a second platform credential to the provisioning server using the provisioning server network address, where the second request includes the device identifier of the computer device.

In some implementations, the platform credential is a JavaScript object notation web token including a payload indicating the device identifier of the computer device.

In some implementations, the request for the platform credential is sent to the provisioning server over a local area network connection or an intranet connection, the response from the provisioning server is received over the local area network connection or the intranet connection, and the sensor data and the platform credential are sent to the platform server over an Internet connection.

Another exemplary implementation of the automatic provisioning techniques described herein includes a computer-implemented method. The method includes obtaining, by a computer device, sensor data from the one or more sensors. The method further includes sending, by the computer device, a request for a platform credential to a provisioning server using a provisioning server network address, where the request includes a device identifier of the computer device. The method further includes receiving, by the computer device, a response from the provisioning server, where the response includes a platform credential and a platform server network address of a platform server. The method further includes storing, by the computer device, the platform credential. The method further includes sending, by the computer device, the sensor data and the platform credential to the platform server using the platform server network address.

In some implementations, the provisioning server network address is hardcoded to the computer device.

In some implementations, the method further includes receiving, by the computer device, a message from the provisioning server, where the message indicates to delete the stored platform credential, deleting, by the computer device, the stored platform credential, and sending, by the computer device, a second request for a second platform credential to the provisioning server using the provisioning server network address, where the second request includes the device identifier of the computer device.

In some implementations, the platform server is a first platform server and the method further includes receiving, by the computer device, a second response from the provisioning server, where the second response includes a second platform credential and a second platform server network address of a second platform server, storing, by the computer device, the second platform credential, and sending, by the computer device, second sensor data and the second platform credential to the second platform server using the second platform server network address.

In some implementations, the platform credential includes an expiration indicator and the method further includes determining, by the computer device, that the platform credential is invalid based on the expiration indicator, and sending, by the computer device, a second request for a second platform credential to the provisioning server using the provisioning server network address, where the second request includes the device identifier of the computer device.

In some implementations, the platform credential is a JavaScript object notation web token including a payload indicating the device identifier of the computer device.

In some implementations, the request for the platform credential is sent to the provisioning server over a local area network connection or an intranet connection, the response from the provisioning server is received over the local area network connection or the intranet connection, and the sensor data and the platform credential are sent to the platform server over an Internet connection.

In some implementations, the provisioning server information is stored and hard-coded on the computer device during a process for manufacturing the computer device.

In some implementations, the platform server generates the platform credential using the device identifier and a secret cryptographic key of the platform server, wherein the platform server verifies the platform credential sent by the computer device using an offline validation process without receiving a further message from the computer device.

Figure 5:
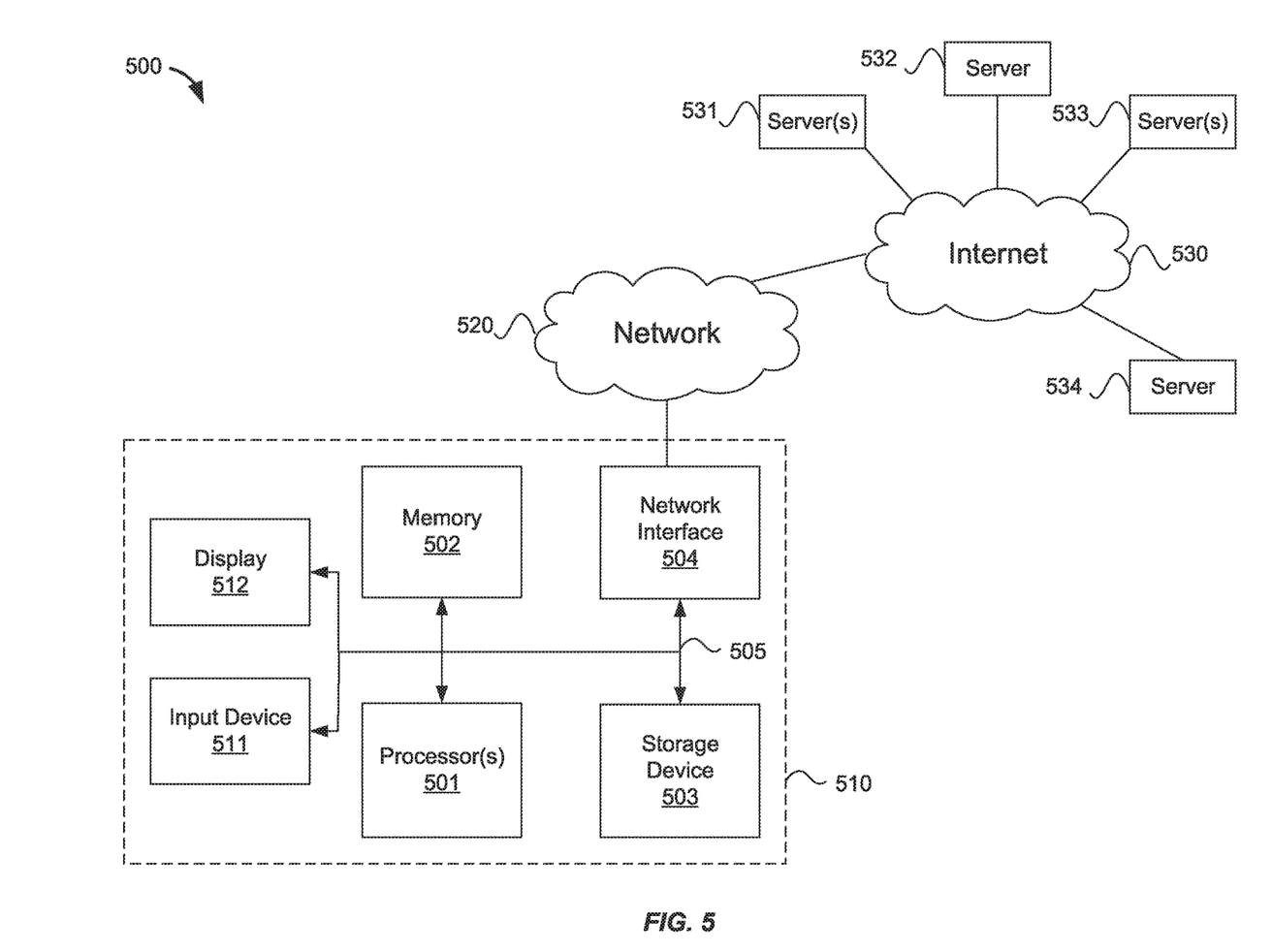
FIG. 5 shows a diagram of hardware of a special purpose computing machine for implementing systems and methods described herein.

FIG. 5 shows a diagram of hardware of a special purpose computing machine for implementing systems and methods described herein. The following hardware description is merely one example. It is to be understood that a variety of computers topologies may be used to implement the above described techniques. The hardware shown in FIG. 5 may be used to implement the computer device providing always on vision triggering as described herein.

An example computer system 510 is illustrated in FIG. 5. The computer system 510 includes a bus 505 or other communication mechanism for communicating information, and one or more processor(s) 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 610 and a network 520. The network interface 504 may be a wireless or wired connection, for example. The computer system 510 can send and receive information through the network interface 504 across a local area network, an Intranet, a cellular network, or the Internet, for example. In the Internet example, a browser, for example, may access data and features on backend systems that may reside on multiple different hardware servers 531-534 across the network. The servers 531-534 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer device, comprising:
one or more processors; one or more sensors; and machine-readable medium coupled to the one or more processors and storing computer program code comprising sets instructions executable by the one or more processors to:
obtain sensor data from the one or more sensors;
determine that no stored platform credential is available;
in response to the determination, send a request for a platform credential to a provisioning server over a local area network using a provisioning server local network address that is hardcoded to the computer device,
the provisioning server and the computer device connected using the local area network and not using the Internet, the request including a device identifier of the computer device, the device identifier being a unique identifier;
receive a response from the provisioning server, the response including a platform credential and a platform server network address of a platform server,
the platform credential based on the device identifier and usable to identify a particular symmetric key for authenticating the platform credential for the computer device in particular;
store the platform credential; and
send the sensor data and the platform credential to the platform server over the Internet using the platform server network address, where the sent platform credential is a JavaScript object notation web token including payload indicating the device identifier of the computer device, and where JavaScript object notation web token further includes a signature generated based on the sent sensor data.

2. The computer device of claim 1, wherein the computer program code further comprises sets of instructions executable by the one or more processors to:
receive a message from the provisioning server, the message indicating to delete the stored platform credential;
delete the stored platform credential; and
send a second request for a second platform credential to the provisioning server using the provisioning local server network address, the second request including the device identifier of the computer device.

3. The computer device of claim 2, wherein the platform server is a first platform server, and wherein the computer program code further comprises sets of instructions executable by the one or more processors to:
receive a second response from the provisioning server, the second response including a second platform credential and a second platform server network address of a second platform server;
store the second platform credential; and
send second sensor data and the second platform credential to the second platform server using the second platform server network address.

4. The computer device of claim 1, wherein the platform credential includes an expiration indicator, the computer program code further comprises sets of instructions executable by the one or more processors to:
determine that the platform credential is invalid based on the expiration indicator; and
send a second request for a second platform credential to the provisioning server using the provisioning server local network address, the second request including the device identifier of the computer device.

5. One or more non-transitory computer-readable medium storing computer program code comprising sets of instructions to:
obtain sensor data from one or more sensors;
determine that no stored platform credential is available;
in response to the determination, send a request for a platform credential to a provisioning server over a local area network using a provisioning local server network address that is hardcoded to the computer device,
the provisioning server and the computer device connected using the local area network and not using the Internet, the request including a device identifier of the computer device, the device identifier being a unique identifier;
receive a response from the provisioning server, the response including a platform credential and a platform server network address of a platform server,
the platform credential based on the device identifier and usable to identify a particular symmetric key for authenticating the platform credential for the computer device in particular;
store the platform credential; and
send the sensor data and the platform credential to the platform server over the Internet using the platform server network address, where the sent platform credential is a JavaScript object notation web token including payload indicating the device identifier of the computer device, and where JavaScript object notation web token further includes a signature generated based on the sent sensor data.

6. The non-transitory computer-readable medium of claim 5, wherein the computer program code further comprises sets of instructions to:
receive a message from the provisioning server, the message indicating to delete the stored platform credential;
delete the stored platform credential; and
send a second request for a second platform credential to the provisioning server using the provisioning local server network address, the second request including the device identifier of the computer device.

7. The non-transitory computer-readable medium of claim 6, wherein the platform server is a first platform server, and wherein the computer program code further comprises sets of instructions to:
receive a second response from the provisioning server, the second response including a second platform credential and a second platform server network address of a second platform server;
store the second platform credential; and
send second sensor data and the second platform credential to the second platform server using the second platform server network address.

8. The non-transitory computer-readable medium of claim 5, wherein the platform credential includes an expiration indicator, and wherein the computer program code further comprises sets of instructions to:
determine that the platform credential is invalid based on the expiration indicator;

send a second request for a second platform credential to the provisioning server using the provisioning local server network address, the second request including the device identifier of the computer device.

9. A computer-implemented method, comprising:
obtaining, by a computer device, sensor data from the one or more sensors;
determining, by the computer device, that no stored platform credential is available;
in response to the determination, sending, by the computer device, a request for a platform credential to a provisioning server over a local area network using a provisioning server local network address that is hardcoded to the computer device,
the provisioning server and the computer device connected using the local area network and not using the Internet, the request including a device identifier of the computer device, the device identifier being a unique identifier;
receiving, by the computer device, a response from the provisioning server, the response including a platform credential and a platform server network address of a platform server,
the platform credential based on the device identifier and usable to identify a particular symmetric key for authenticating the platform credential for the computer device in particular;
storing, by the computer device, the platform credential; and
sending, by the computer device, the sensor data and the platform credential to the platform server over the Internet using the platform server network address, where the sent platform credential is a JavaScript object notation web token including payload indicating the device identifier of the computer device, and where JavaScript object notation web token further includes a signature generated based on the sent sensor data.

10. The computer-implemented method of claim 9, further comprising:
receiving, by the computer device, a message from the provisioning server, the message indicating to delete the stored platform credential;
deleting, by the computer device, the stored platform credential; and
sending, by the computer device, a second request for a second platform credential to the provisioning server using the provisioning server local network address, the second request including the device identifier of the computer device.

11. The computer-implemented method of claim 9, wherein the platform server is a first platform server, the method further comprising:
receiving, by the computer device, a second response from the provisioning server, the second response including a second platform credential and a second platform server network address of a second platform server;
storing, by the computer device, the second platform credential; and
sending, by the computer device, second sensor data and the second platform credential to the second platform server using the second platform server network address.

12. The computer-implemented method of claim 9, wherein the platform credential includes an expiration indicator, the method further comprising:
determining, by the computer device, that the platform credential is invalid based on the expiration indicator; and
sending, by the computer device, a second request for a second platform credential to the provisioning server using the provisioning server local network address, the second request including the device identifier of the computer device.

13. The computer device of claim 1, wherein the device identifier is usable by the platform server to identify a symmetric key usable to authenticate the platform credential of the computer device.

14. The computer device of claim 1, wherein the provisioning server is installed at the same site as the computer device.

15. The computer device of claim 1, wherein a network credential for use in communicating with the provisioning server are also hardcoded to the computer device, the request to the provisioning server using the network credential.

16. The computer device of claim 1, wherein the provisioning server is an on-premises server.

17. The computer device of claim 1, wherein the provisioning server local network address is hardcoded to the computer device during manufacture.

* * * * *